July 18, 1933.  J. M. HARGRAVE  1,918,469
CLAMP AND METHOD OF MANUFACTURING THE SAME
Filed July 30, 1931
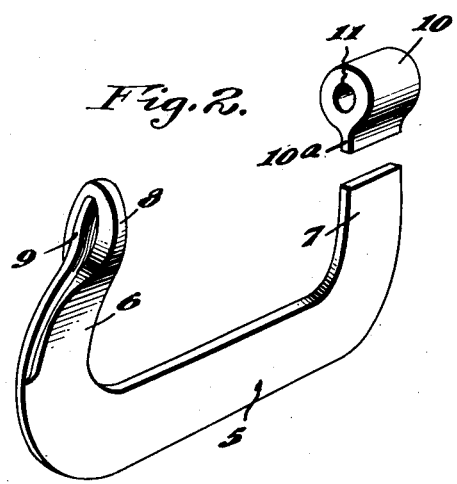
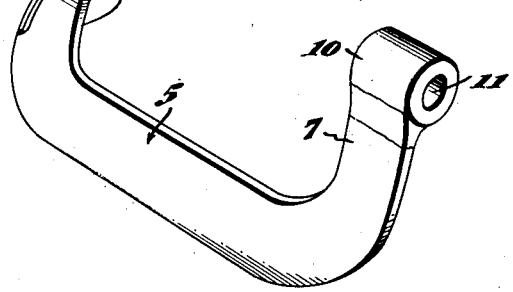
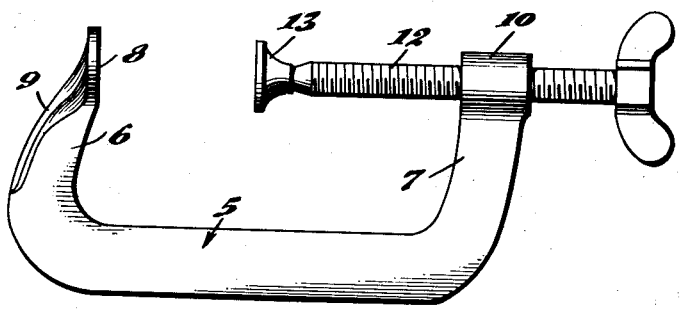
INVENTOR
John M. Hargrave
BY
Wood & Wood
ATTORNEYS Patented July 18, 1933

1,918,469

UNITED STATES PATENT OFFICE

JOHN M. HARGRAVE, OF CINCINNATI, OHIO

CLAMP AND METHOD OF MANUFACTURING THE SAME

Application filed July 30, 1931. Serial No. 554,043.

This invention relates to clamps, and is particularly directed to improvements in the manufacture and construction of that type of clamp known as the C-type, wherein one arm includes a stationary pad or jaw opposing an adjustable jaw or screw mounted in the other arm. Heretofore, the bodies of these clamps have been of heavy malleable iron construction or drop forgings.

It is the broad object of this invention to form an improved clamp body and method of manufacturing the same by assembling and integrally joining pieces of metal for disposing particular metals at proper points in the structure of the clamp for added advantages in strength and durability and lightness in weight.

The more particular features are that the pad is formed in the body of the material after the body has been initially formed into a general C-shape and the nut portion for the screw is a separate piece of a particular metal integrally united to the body, the metal of the nut portion being suitable for more efficient drilling and tapping and the metal constituting the major portion of the clamp body being suitable for purposes of greater resistance against twisting strains and therefore greater rigidity and durability.

It is a further object to provide an improved method of electrically welding the parts together wherein the mass of metal of the nut and main piece is evenly distributed in these respective parts at the point of contact or welded attachment for uniform heating of the parts and proper flow of electricity.

Other objects and further advantages will be more fully apparent from a description of the accompanying drawing, in which:

Figure 1 is a side view illustrating the flat steel piece bent into C-shape in the initial operation.

Figure 2 is a perspective view showing the C-shaped body piece and illustrating the pad formed on one of the arms of the body as the second operation, the nut piece being shown apart from the C-shaped piece at its point of attachment.

Figure 3 is a perspective view illustrating the third step in the assembly wherein the nut is welded to the arm of the body opposing the pad.

Figure 4 is a side view of the completed clamp, showing the clamping screw assembled therewith after the drilling and tapping operations.

Described in general, the method of manufacturing the clamp includes three distinct steps; the first being the forming of a length of bar steel into C-shape, the second being the forming of the pad on one of the arms, and the third being the integral attachment of the nut on the arm opposing the pad.

The heat treatment is simplified throughout these operations in that the flat major portion of the clamping body is of high carbon steel, separately treated to provide the required strength, whereas the nut is of low carbon steel for the purposes of easy drilling and tapping. Before the assembly is complete or before the nut is in place and during the heating operations for forming, the piece of high carbon steel may be heat-treated for further increasing its stiffness, whereupon the drilling and tapping operations for the nut are thereafter completed when the nut is in place.

Referring to the drawings, the length of steel forming the C-shaped body of the clamp is indicated at 5, and provides arms 6 and 7. This C-shaped body is placed over a form and the pad 8 is formed on one arm of the clamp, being flattened out under pressure to provide a broad face opposing the opposite arm and including a strengthening rib 9 at right angles to the broad face and at the rear thereof. The formation of the C-shaped body and the pad thereof is accomplished under heat and at the same time appropriate temperatures of heat and the proper quenching operations may be applied for increasing the strength of the part.

This formed body is then placed in a special jig and the generally cylindrical formed piece 10 of low carbon steel of rolled stock is welded to the outer end of the arm opposing the pad, the axis of the cylindrical piece being at right angles and extending directly toward the center of the pad. This nut piece, preferably includes a radial fin 10ª (see Figure 2) as the attachment portion is adapted to be affixed to the arm 7 of the C-shaped piece.

The cylindrical piece in some instances, as in large sizes, is drilled initially as at 11, that is before attachment, for reducing its mass somewhat, this drilled hole being as to the finished drilling and tapping thereof in perfect alignment with the center of the pad. This reduction in the mass of the nut causes a more even distribution of heat about the contact point of the nut with the body during the electric welding operation, whereby the current flow is more even for a more perfect weld. Drilling and tapping operations are then performed through the axis of the cylindrical piece and a screw 12 is mounted therein having a tip 13 on its inner end opposing the pad.

It will be apparent that in a clamp body cast or forged in one piece, as has been done heretofore, it is necessary to anneal the steel before it can be drilled and tapped, because a high carbon steel is necessary in the body of the clamp to obtain the required strength. Consequently, by welding pieces together, it is possible to use a low carbon steel for the nut, which lends itself more readily to the necessary machining, drilling and tapping operations.

By this process of manufacture and arrangement of parts, the proper arrangement of metals is provided in the clamp for aiding in machining and for adding to the strength thereof.

Having described my invention, I claim:

1. The process of forming a clamp body comprising forming a length of high carbon metal into C-shape, forming a pad upon one of the arms of C-shaped metal, welding a nut piece of low carbon metal on the other arm and thereafter tapping said nut piece at right angles to the pad.

2. The process of forming a clamp body comprising forming a length of high carbon metal into C-shape and including a pad on one arm, welding a hollow cylindrical piece of low carbon metal on the other arm, disposing its axis at right angles to the pad, and subsequently screw threading said hollow cylindrical piece of metal.

3. The process of forming a clamp body, comprising forming a length of metal into C-shape and including a pad on one arm, forming a cylindrical piece of low carbon metal to include a radial fin and welding the fin of the cylindrical piece of metal on the other arm of said C-shaped length of metal, disposing the axis of the cylindrical piece at right angles to the pad.

4. A clamp body comprising a length of high carbon metal of bar stock bent into C-shape and having a pad on one arm thereof, and a generally cylindrically formed nut piece of low carbon metal of rolled stock welded in position on the other arm of said length of metal and screw-threaded to receive a clamping screw.

5. A clamp body comprising a length of high carbon metal of C-shape having a pad on one arm thereof and a generally cylindrically formed nut piece of low carbon metal including a radial fin welded in position on the other arm of said length of metal and including screw threads for receiving a clamping screw.

JOHN M. HARGRAVE.